(12) United States Patent
Talawar et al.

(10) Patent No.: US 9,334,972 B2
(45) Date of Patent: May 10, 2016

(54) COMPOSITE INJECTION MOLDED CHECK VALVE WITH INTEGRATED FEATURES

(71) Applicant: HONEYWELL INTERNATIONAL INC., Morristown, NJ (US)

(72) Inventors: Ravi Talawar, Karnataka (JP); Vikram Kumar, Karnataka (JP); David Antony, TamilNadu (IN); Albert Kang, Chandler, AZ (US); Gary E. Armstrong, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 110 days.

(21) Appl. No.: 14/279,121

(22) Filed: May 15, 2014

(65) Prior Publication Data

US 2015/0330524 A1  Nov. 19, 2015

(51) Int. Cl.
*F16K 15/03* (2006.01)

(52) U.S. Cl.
CPC .............. *F16K 15/03* (2013.01); *F16K 15/038* (2013.01); *Y10T 137/7903* (2015.04)

(58) Field of Classification Search
CPC ............................... F16K 13/03; F16K 15/035
USPC ................ 137/527.8, 527, 512; 251/306, 308
See application file for complete search history.

(56) References Cited

U.S. PATENT DOCUMENTS

| | | | | |
|---|---|---|---|---|
| 2,877,792 A * | 3/1959 | Tybus | ................... | F16K 15/038 137/512.1 |
| 2,934,084 A * | 4/1960 | Adams | .................... | F16K 15/03 137/527.4 |
| 3,023,771 A * | 3/1962 | Hinds | ................... | F16K 15/038 137/454.2 |
| 3,448,465 A * | 6/1969 | Morrow | ................ | A61F 2/2403 137/527.8 |
| 3,452,778 A * | 7/1969 | Babcock | ............... | F16K 15/038 137/512.1 |
| 3,565,395 A * | 2/1971 | Hansen | ............... | F16K 27/0218 251/306 |
| 3,603,341 A * | 9/1971 | Scaramucci | .......... | F16K 1/2263 137/375 |
| 3,771,763 A * | 11/1973 | Myers | .................... | F16K 1/2285 251/152 |
| 3,815,629 A | 6/1974 | Oberholtzer | | |
| 4,043,358 A * | 8/1977 | Sliski | .................... | F16K 15/038 137/512.1 |
| 4,079,751 A * | 3/1978 | Partridge | .............. | F16K 15/038 137/512.1 |
| 4,257,451 A * | 3/1981 | Paton | .................... | F16K 15/038 137/512.1 |
| 4,373,216 A * | 2/1983 | Klawitter | .............. | A61F 2/2403 137/512.1 |
| 4,774,981 A * | 10/1988 | Mizusawa | ............. | F16K 15/038 137/512.1 |
| 4,800,915 A * | 1/1989 | Hormel | ..................... | F16K 1/22 137/340 |

(Continued)

OTHER PUBLICATIONS

Matrix Industrial Specialties; Water Works; Retrieved from Internet [http://www.matrixindustrial.net/Pages/WaterWorks.aspx] Feb. 24, 2014.

*Primary Examiner* — Craig Schneider
*Assistant Examiner* — Daniel P Donegan
(74) *Attorney, Agent, or Firm* — Ingrassia Fisher & Lorenz, P.C.

(57) ABSTRACT

A check valve includes a valve body, a pair of stoppers, a hinge pin, and one or more flappers. The valve body includes an inlet end, an outlet end, and an inner surface that defines a flow passage between the inlet end and the outlet end. The inner surface further defines a valve seat adjacent the inlet end. The stoppers are integrally formed on the valve body inner surface, and each has a first end and a second end. The hinge pin is disposed within each hinge pin opening and extends across the flow passage. The flappers are disposed within the flow passage and are rotationally mounted on the hinge pin. Each of the one or more flappers is rotatable between a closed position, in which the flapper engages the valve seat, and a full-open position, in which the flapper engages the pair of stoppers.

17 Claims, 9 Drawing Sheets

(56) References Cited

U.S. PATENT DOCUMENTS

| | | | | |
|---|---|---|---|---|
| 4,825,902 | A | | 5/1989 | Helms |
| 4,888,010 | A | * | 12/1989 | Bokros .................. A61F 2/2403 137/512.1 |
| 4,892,540 | A | * | 1/1990 | Vallana .................. A61F 2/2403 137/512.1 |
| 4,896,695 | A | * | 1/1990 | Pysh ..................... F16K 15/038 137/512.1 |
| 5,152,501 | A | * | 10/1992 | Raymond, Jr. ......... F16K 1/2268 251/305 |
| 5,197,980 | A | * | 3/1993 | Gorshkov .............. A61F 2/2403 137/512.1 |
| 5,370,148 | A | * | 12/1994 | Shafer ...................... F16K 1/22 137/15.25 |
| 5,806,830 | A | * | 9/1998 | Alvarez ............... F16K 27/0218 251/145 |
| 5,927,686 | A | * | 7/1999 | DeLeon .................... F16K 1/22 251/305 |
| 6,543,413 | B2 | * | 4/2003 | Lozen ....................... F02D 9/10 123/337 |
| 6,648,010 | B1 | * | 11/2003 | Goodwin ................. F16K 15/03 137/491 |
| 6,932,100 | B2 | | 8/2005 | Martin et al. |
| 7,311,740 | B2 | * | 12/2007 | Williams ............... F16K 15/038 137/512.1 |
| 7,472,885 | B2 | | 1/2009 | McDowall et al. |
| 7,493,770 | B2 | * | 2/2009 | Christianson ............ F02C 6/08 137/512.1 |
| 7,527,069 | B2 | * | 5/2009 | Denike .................. F16K 31/082 137/487.5 |
| 7,730,679 | B2 | * | 6/2010 | Eckenswiller ............ E06B 7/14 137/527.8 |
| 8,800,596 | B2 | * | 8/2014 | Kamp .................. F16K 27/0227 137/512.1 |
| 2003/0131891 | A1 | * | 7/2003 | Sinur ..................... F16K 15/03 137/527.8 |
| 2005/0062008 | A1 | * | 3/2005 | Makino .................... B29C 45/14 251/306 |
| 2009/0032118 | A1 | * | 2/2009 | Dulay ................... F16K 15/038 137/527 |
| 2009/0078907 | A1 | * | 3/2009 | Ekstrom ................. F16L 9/128 251/368 |
| 2012/0234408 | A1 | * | 9/2012 | Tornquist .............. F16K 15/038 137/527 |
| 2013/0019966 | A1 | * | 1/2013 | Hawa ....................... F16K 1/22 137/527 |
| 2013/0240051 | A1 | * | 9/2013 | Miller ..................... F16K 15/03 137/15.19 |
| 2013/0258590 | A1 | * | 10/2013 | Sun ..................... F04D 25/0613 361/695 |
| 2013/0258591 | A1 | * | 10/2013 | Sun ..................... F04D 25/0613 361/695 |
| 2013/0340862 | A1 | * | 12/2013 | Kamp ................... F16K 15/038 137/511 |
| 2014/0202562 | A1 | * | 7/2014 | Kamp ..................... F16K 47/00 137/512.1 |
| 2014/0251461 | A1 | * | 9/2014 | Rankin ................. F16K 15/038 137/512.1 |
| 2015/0240960 | A1 | * | 8/2015 | Kamp ................... F16K 15/031 137/856 |

\* cited by examiner

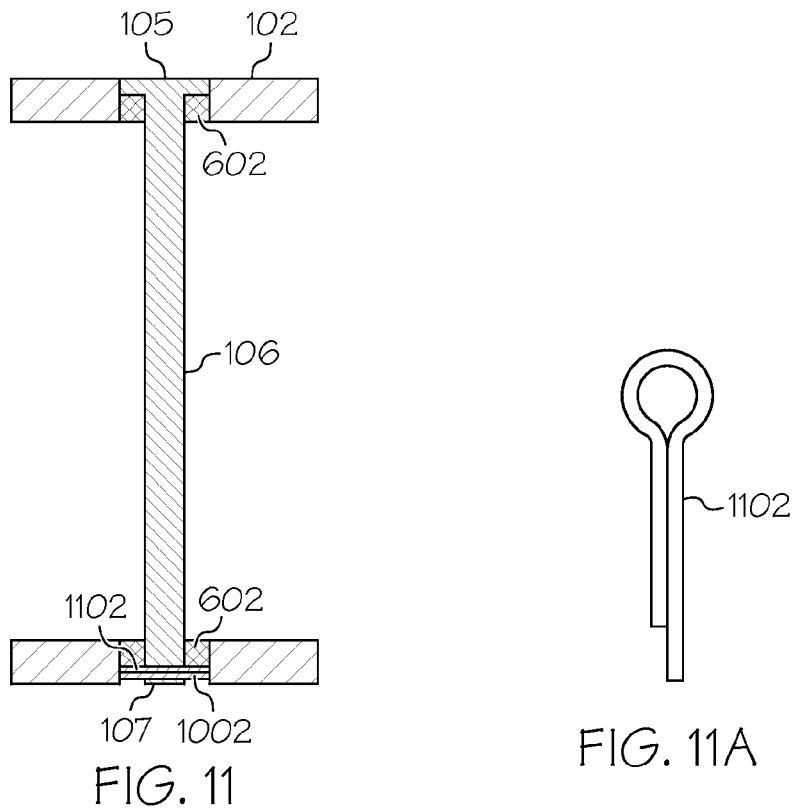
FIG. 11
FIG. 11A
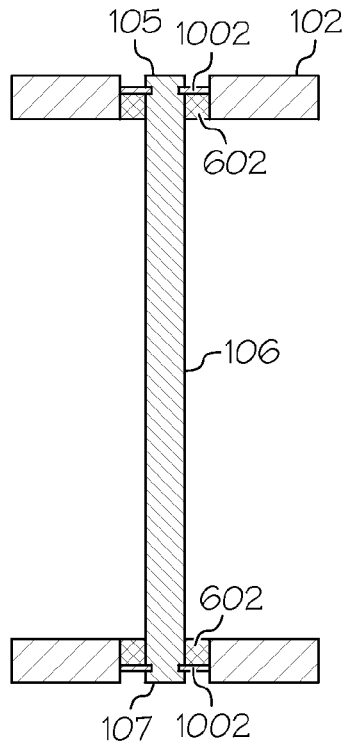
FIG. 12

COMPOSITE INJECTION MOLDED CHECK VALVE WITH INTEGRATED FEATURES

TECHNICAL FIELD

The present invention generally relates to check valves, and more particularly relates to a composite injection molded check valve with integrated features.

BACKGROUND

Check valves may be used in any one of numerous circumstances in which air flow may need to be regulated. One particular type of check valve is a split flapper check valve that includes a valve housing and a valve assembly. The valve housing defines a flow passage, and the valve assembly is disposed within the flow passage and is secured to the valve housing. The valve assembly includes a valve body having an opening, a hinge pin that extends across the opening, two valve flappers rotationally mounted on the hinge pin, and a stop tube that also extends across the opening. When airflow impinges on an upstream side of the valve flappers, one or both of the valve flappers unseat from the valve body to allow air to flow through the flow passage. In the full-open positions, the valve flappers engage the stop tube.

The above-described split flapper check valve is assembled by mounting the flappers on the hinge pin, and securing the hinge pin to the valve body via a clearance fit. The stop tube may also be secured to the valve body via a clearance fit. The valve body is then coupled to the valve housing using the two rivets. This assembly procedure can be tedious and time-consuming, which increases overall costs.

The above-described split flapper check valve can also exhibit leakage and wear issues. In particular, leakage may occur between the hinge pin and the valve housing, and between the valve body and the valve housing. The flappers are not highly loaded when the valve is open. As a result, the valve flappers may be vulnerable to motion and wear due to vibration and aerodynamic flutter. This can result in early field issues, warranty costs, and customer dissatisfaction. Moreover, the hinge pin may rotate, which can cause it to wear. In the full-open position, the flappers contact the stop tube, which can also cause wear.

Hence, there is a need for a split flapper check valve that does not exhibit the leakage and wear issues of presently known check valves, such as the wear issues at the hinge and the contact location between the flapper and any associated stop, and that does not rely on a relatively tedious, time-consuming, and thus costly assembly procedure. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a check valve includes a valve body, a pair of stoppers, a hinge pin, and one or more flappers. The valve body includes an inlet end, an outlet end, and an inner surface that defines a flow passage between the inlet end and the outlet end. The inner surface further defines a valve seat adjacent the inlet end. The stoppers are integrally formed on the valve body inner surface, and each has a first end and a second end. Each first end is disposed proximate the inlet end and includes a hinge pin opening formed therein, and each second end is disposed downstream of the first end. The hinge pin is disposed within each hinge pin opening and extends across the flow passage. The one or more flappers are disposed within the flow passage and are rotationally mounted on the hinge pin. Each of the one or more flappers is rotatable between a closed position, in which the flapper engages the valve seat, and a full-open position, in which the flapper engages the pair of stoppers.

In another embodiment, a check valve includes a valve body, a pair of stoppers, a hinge pin, and a pair of flappers. The valve body includes an inlet end, an outlet end, and an inner surface that defines a flow passage between the inlet end and the outlet end. The inner surface further defines a valve seat adjacent the inlet end. The pair of stoppers are integrally formed on the valve body inner surface, and each stopper has a first end and a second end. Each first end is disposed proximate the inlet end and has a hinge pin opening formed therein that extends through the valve body. Each second end is disposed downstream of the first end. The hinge pin is press fit into each hinge pin opening, and extends through each hinge pin opening and across the flow passage. The pair of flappers is disposed within the flow passage and is rotationally mounted on the hinge pin. Each flapper is rotatable between a closed position, in which the flapper engages the valve seat, and a full-open position, in which the flapper engages the pair of stoppers. Each stopper is dimensioned such that the first end extends radially inwardly from the inner surface a first distance, the second end extends radially inwardly from the inner surface a second distance, and the first distance is greater than the second distance. The valve body, the stoppers, the hinge pin, and flappers are all formed of a fiber reinforced plastic.

Furthermore, other desirable features and characteristics of the check valve will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein:

FIGS. 4-13 depict various techniques for non-rotationally mounting a hinge pin in the split flapper check valve of FIG. 1;

FIG. 11A depicts an embodiment of a lock pin;

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Although various embodiments described herein are configured as split flapper check valves, it will be appreciated that this is merely exemplary of one particular embodiment and that various other types of check valves, including those one or multiple flappers. Furthermore, there is no intention to be bound by any expressed or implied theory presented in the preceding technical field, background, brief summary, or the following detailed description.

Figure 1:
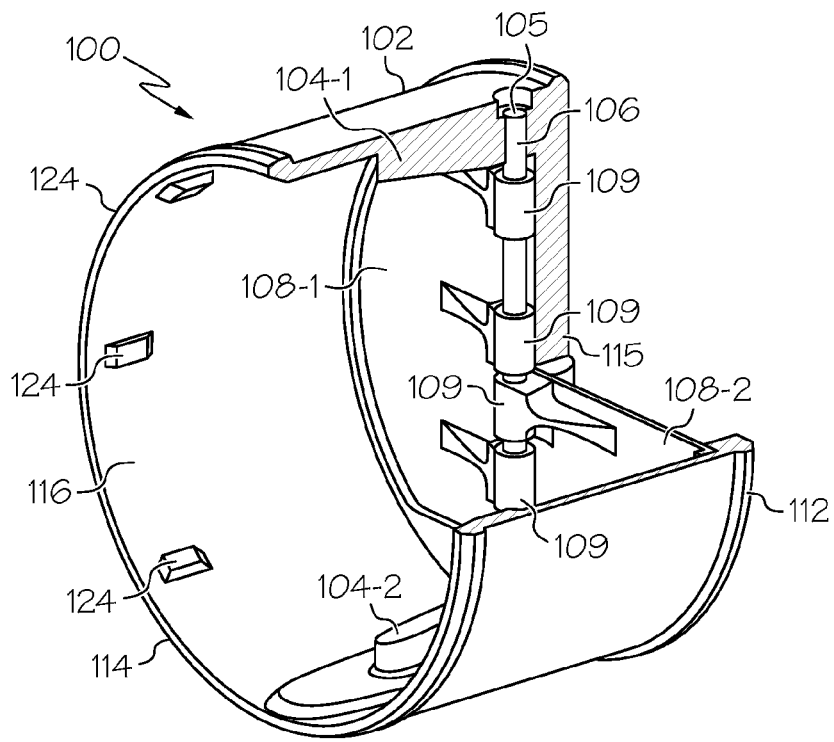
FIG. 1 depicts a partial cut-away plan view of one embodiment of a split flapper check valve.

Referring to FIG. 1, one embodiment of a split flapper check valve 100 is depicted and includes a valve body 102, a pair of stoppers 104 (104-1, 104-2), a hinge pin 106, and a pair of flappers 108 (108-1, 108-2). The valve body 102, as shown more clearly in FIG. 2, includes an inlet end 112, an outlet end 114, and an inner surface 116. The inner surface 116 defines a flow passage 118 that extends between the inlet end 112 and the outlet end 114, and further defines a valve seat 122 that is disposed adjacent to the inlet end 112. The depicted valve body 102 additionally includes an integral support structure 115 that extends across the flow passage 118 at the inlet end 112.

Figure 2:
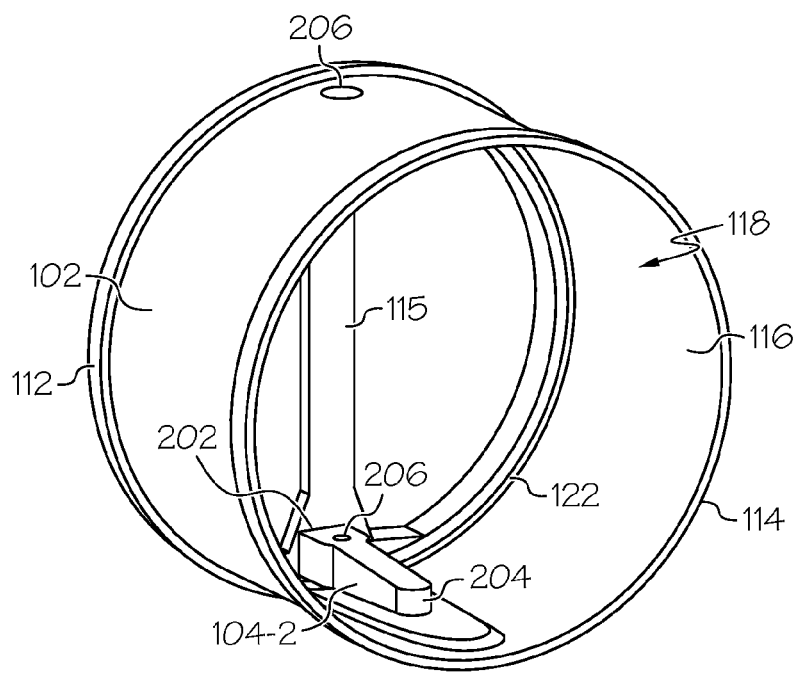
FIG. 2 depicts a plan view of a valve body that may be used to implement the split flapper check valve of FIG. 1.

Referring now to both FIG. 1 and FIG. 2, the stoppers 104 are integrally formed on the valve body inner surface 116 and, as will be described below, are configured to limit rotation of the flappers 108. Each stopper 104 has a first end 202 and a second end 204. The first end 202 of each stopper 104 is disposed proximate the inlet end 112, and has a hinge pin opening 206 formed therein that extends through the valve body 102. The second end 204 of each stopper 104 is disposed downstream of the first end 202.

The hinge pin 106 includes a first end 105 and a second end 107 (not visible in FIG. 1), and is disposed within each hinge pin opening 206 and extends across the flow passage 118. In the depicted embodiment, the hinge pin 106 is disposed adjacent to the support structure 115. The hinge pin 106 is disposed within each hinge pin opening 206 such that it is non-rotationally coupled to the valve body 102. The manner in which the hinge pin 106 is non-rotationally coupled to the valve body 102 may vary. Some exemplary variations are described in more detail further below.

The flappers 108 are disposed within the flow passage 118 and are rotationally mounted, via a plurality of lugs 109, on the hinge pin 106. Each flapper 104 is rotatable between a closed position and a full-open position. In the closed position, which is the position depicted in FIG. 1, the flappers 104 engage the valve seat 122, and thus block flow through the flow passage 118. In the full-open position (not depicted), the flappers engage the stoppers 104 and allow flow through the flow passage 118.

Figure 3:
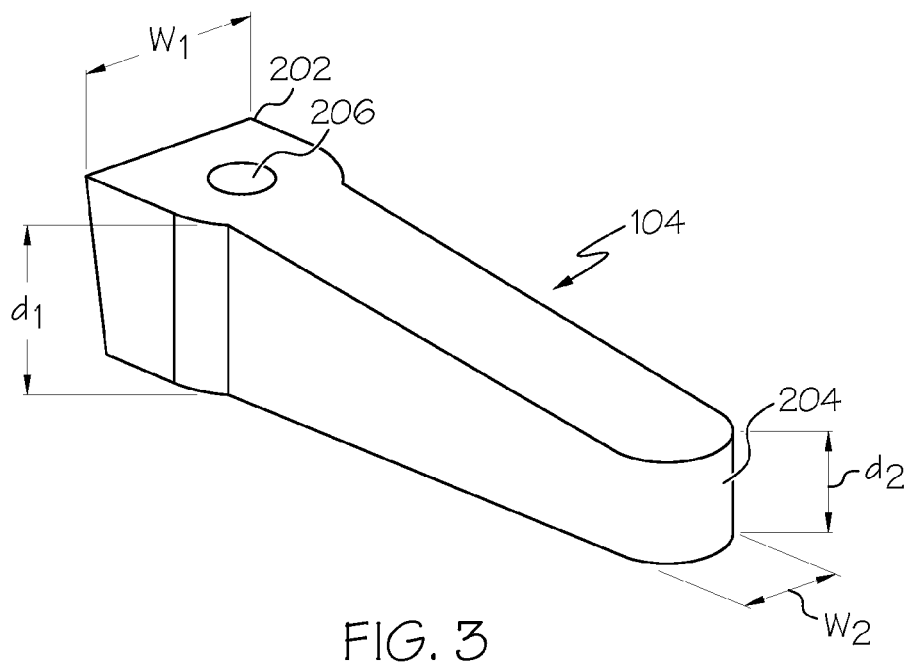
FIG. 3 depicts a close-up, plan view of a stopper than may be integrally formed with the valve body of FIG. 2.

The stoppers 104, as already noted, are integrally formed with the valve body 102. In a particular embodiment, the valve body 102 and stoppers 104 are formed of an injection molded fiber reinforced plastic. In addition to be integrally formed with the valve body 102, the stoppers 104 are also configured to provide an increased contact surface area for the flappers 108 as compared to conventional split flapper check valves. In the depicted embodiment, and a shown more clearly in FIG. 3, this is implemented by each stopper 104 being dimensioned such that the first end 202 extends radially inwardly a first distance ($d_1$) from the inner surface 116 of the valve body 102, and has a first width ($w_1$). Moreover, the second end 204 extends radially inwardly a second distance ($d_2$) from the inner surface 116 of the valve body 102 and has a second width ($w_2$). The first distance ($d_1$) is greater than the second distance ($d_2$), and the first width ($w_1$) is greater than the second width ($w_2$). The stoppers 104 may also have, if desired, one or more stiffening ribs formed thereon.

Figure 4:
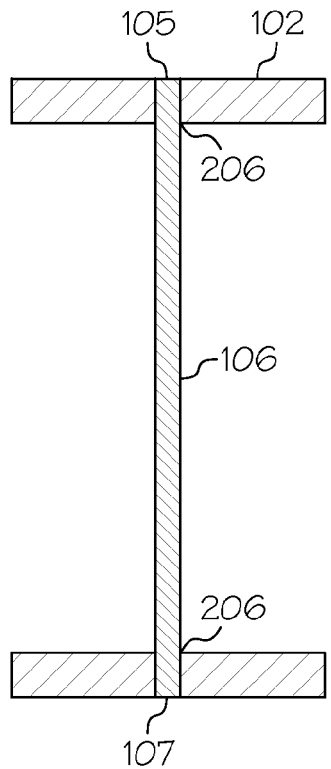
Figure 5:
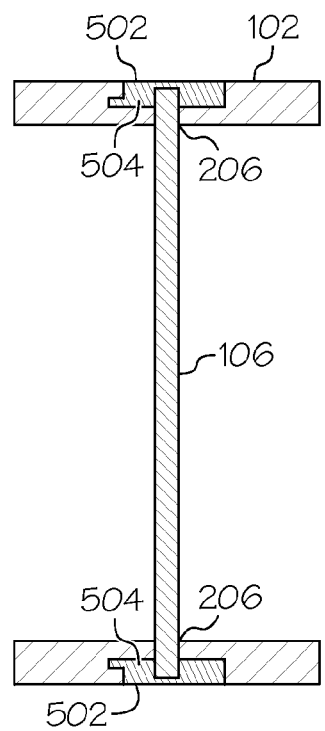

It was noted above that the hinge pin 106 may be non-rotationally coupled to the valve body 102 using various techniques. Some non-limiting examples of these techniques will now be described. With reference to FIG. 4, one technique is to simply press fit the hinge pin 106 into the hinge pin openings 206. Another technique, which is depicted in FIG. 5, is to include a pair of adhesive pockets 502 in the valve body 102. In particular, each adhesive pocket 502 is formed in the valve body 102 around one of the hinge pin openings. Thereafter, an adhesive 504 is disposed in each adhesive pocket 502 and around a portion of the hinge pin 106.

Figure 6:
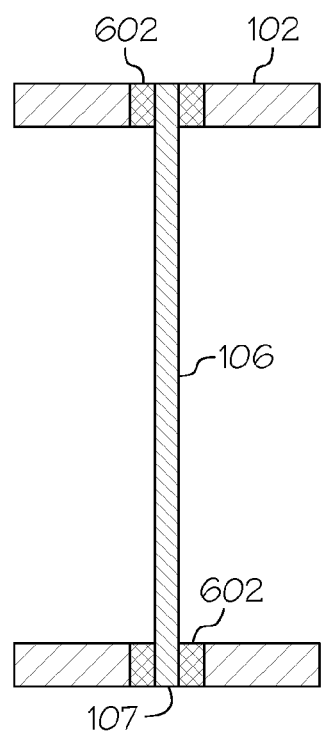
Figure 7:
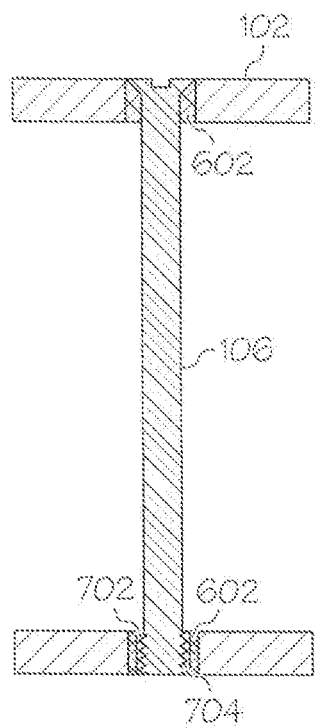
Figure 8:
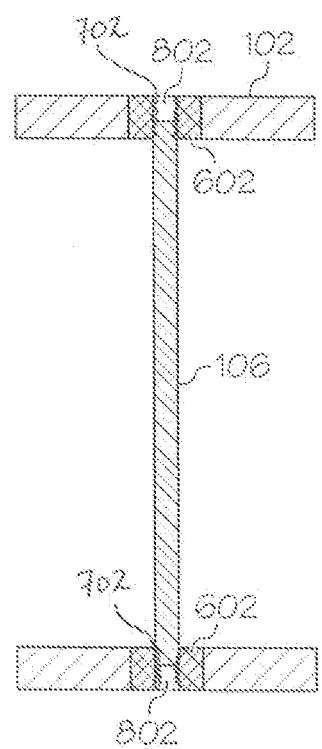

In various other embodiments, the check valve 100 includes a pair of inserts, with one insert being disposed in a different one of the hinge pin openings 206. In the embodiment depicted in FIG. 6, the hinge pin 106 is press fit into each of the inserts 602. In the embodiment depicted in FIG. 7, at least one of the inserts 602 has insert threads 702 formed on an inner surface thereof The insert threads 702 are configured to mate with pin threads 704 that are formed on at least a portion of the outer surface of the hinge pin 106. In the embodiment depicted in FIG. 8, both inserts 602 have threads 702 formed on the inner surfaces thereof, and a grub screw 802 is threaded into a different one of the inserts 602 to secure the hinge pin 106 in place. In other embodiments, only one of the inserts 602 may have threads formed on its inner surface, and only a single grub screw 802 is used.

Figure 9:
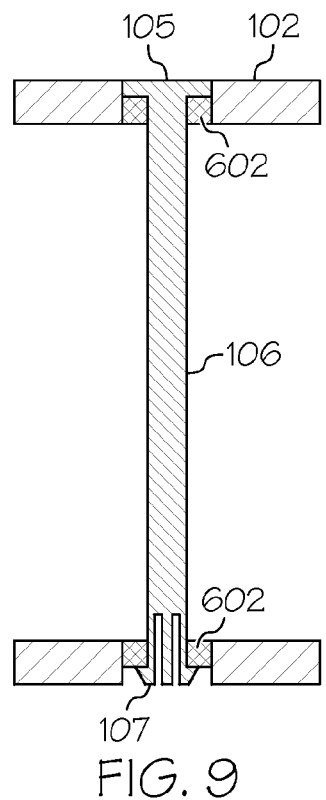

In yet another embodiment, which is depicted in FIG. 9, the first end 105 of the hinge pin 106 is flat, and the second end 107 of the hinge pin 106 is configured as a collet. The first end 105 engages one of the inserts 602, and the second end 107 extends through and engages the other one of the inserts 602.

Figure 10:
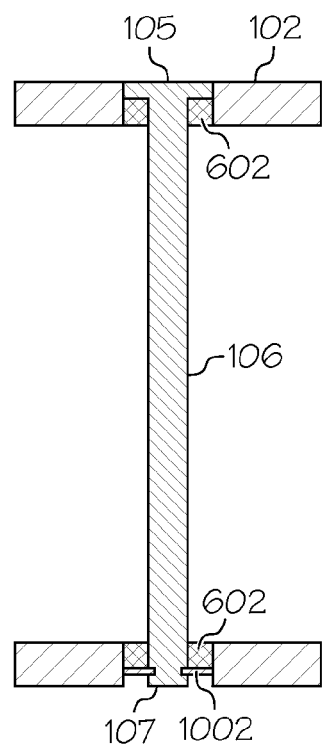
Figure 10A:
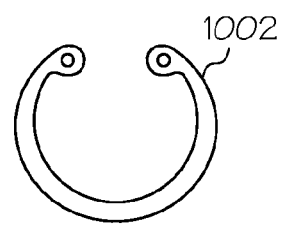
FIG. 10A depicts an embodiment of a clip that may be used to engage the hinge pin.
Figure 13:
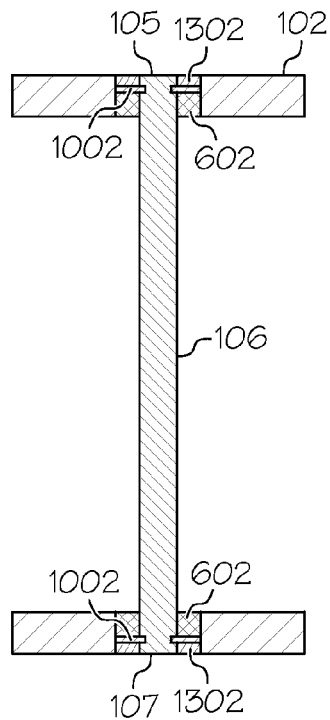

In the embodiments depicted in FIGS. 10-13, the check valve 100 includes, and the hinge pin 106 is engaged by, one or more clips 1002. In the embodiments depicted in FIGS. 10 and 11, the check valve 100 includes one clip 1002 (see FIG. 10A), and in the embodiments depicted in FIGS. 12 and 13, the check valve 100 includes two clips 1002. Regardless of the number of clips 1002, each clip 1002 is disposed around and engages either the first end 105 or the second end 107 of the hinge pin 106. The clip(s) 1002 may be implemented using C-clips, E-clips, or various other types of suitably shaped and configured clips. It is noted that in the embodiment depicted in FIG. 11, a lock pin 1102 (see FIG. 11A) is included, and in the embodiment depicted in FIG. 13, an adhesive 1302, such as a resin adhesive, is additionally included. It will be appreciated that the lock pin 1102 could be included in the embodiments that have two clips 1002, and that the adhesive could be included in the embodiments that have one clip 1002.

Figure 14:
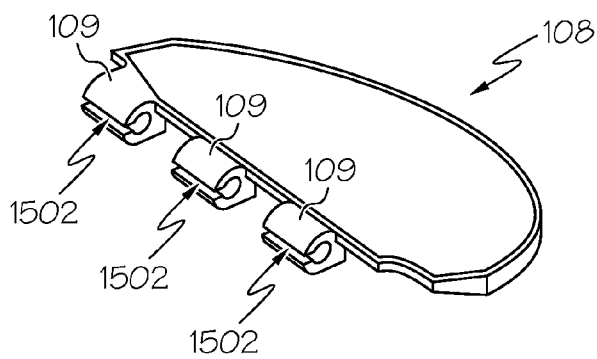
FIG. 14 is a plan view of one embodiment of a flapper that may be used to implement the split flapper check valve of FIG. 1.
Figure 15:
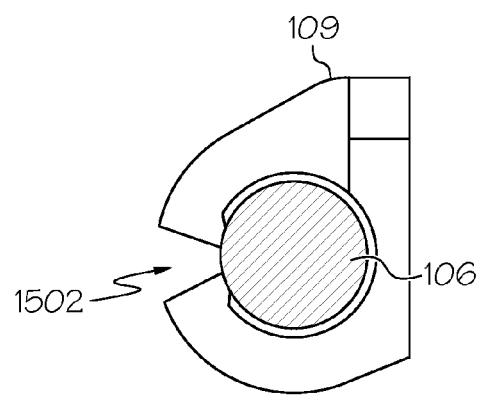
FIG. 15 is a cross section view of a portion of the flapper depicted in FIG. 14, illustrating how the flapper may be mounted on a hinge pin.

Similar to the valve body 102 and integral stoppers 104, the flappers 108, at least in a preferred embodiment, are formed of an injection molded fiber reinforced plastic. The flappers 108 may also be variously configured to be rotationally mounted on the hinge pin 106. In one embodiment, which is depicted in FIGS. 14 and 15, each flapper 108 is configured to be snap fit onto the hinge pin 106. To do so, the lugs 109 on each flapper 108 have a gap 1502, which allows the lugs 109 to be snap fit onto the hinge pin 106. In these embodiments, the lugs 109 may be at least partially metal insert molded.

Figure 16:
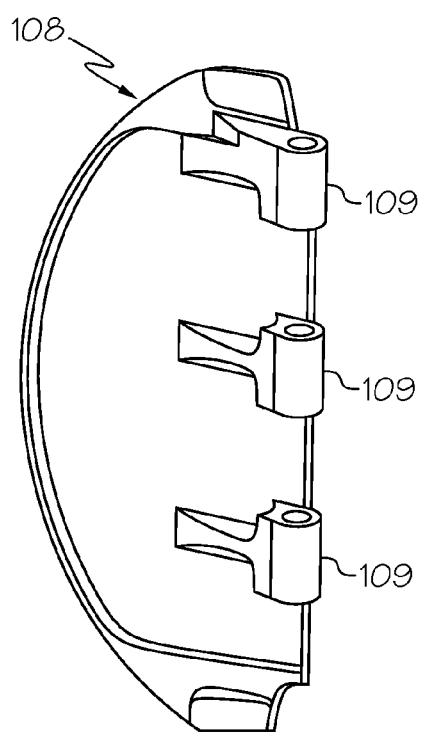
FIGS. 16 and 17 depict alternative embodiments of a flapper that may be used to implement the split flapper check valve of FIG. 1.
Figure 17:
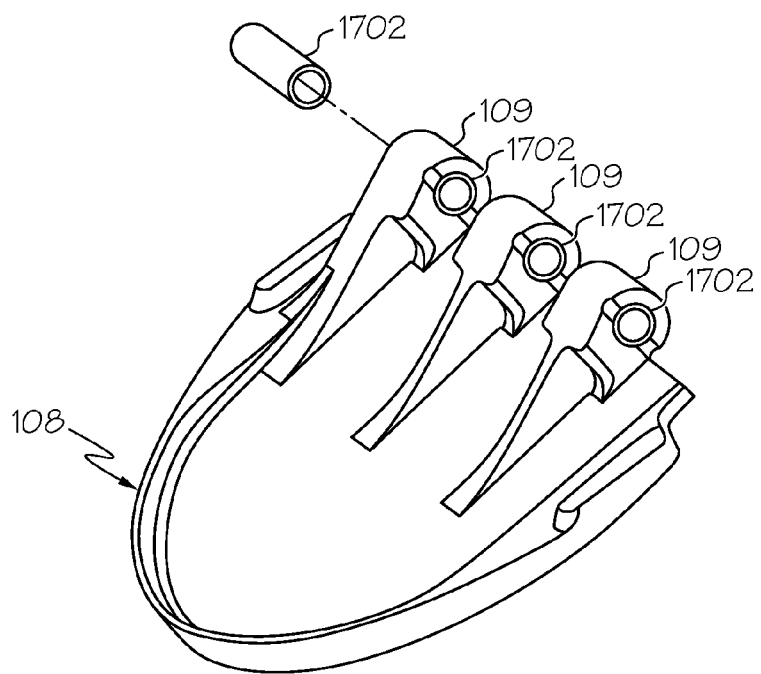

In other embodiments, such as the ones depicted in FIGS. 16 and 17, the lugs 109 do not include a gap. In these embodiments, the hinge pin 106 is slid through each of the lugs 109. The difference between FIGS. 16 and 17 is that metal sleeves 1702 are disposed in each of the lugs 109 in the embodiment depicted in FIG. 17. The metal sleeves 1702, when included, may be formed of various materials. Some exemplary materials include relatively thin sheet metal, or a customized insert with external knurls formed thereon. Regardless of the particular material, the metal sleeves 1702 are preferably formed to have a smooth finish on the inner surface to reduce wear during flapper rotation.

Figure 18:
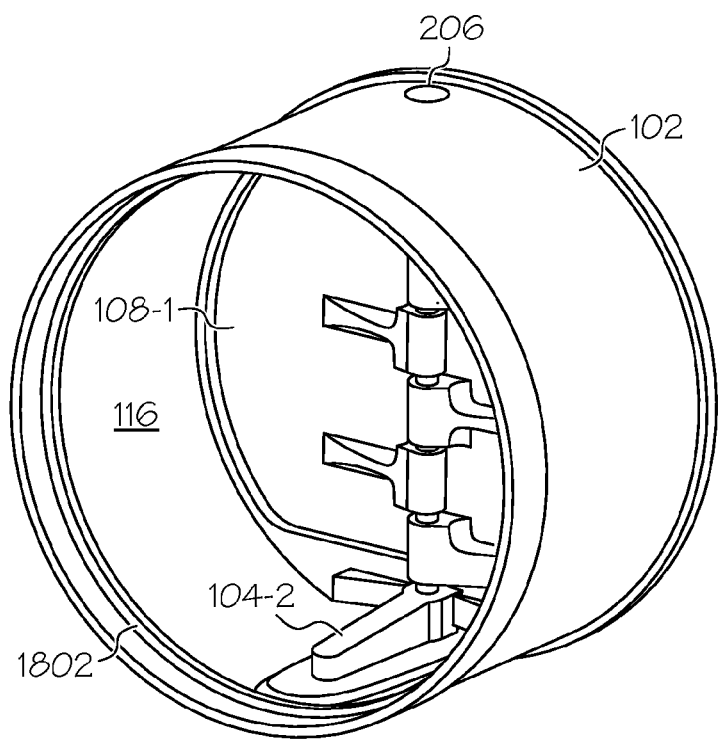
FIGS. 18 and 19 depict the split flapper check valve of FIG. 1 with various reinforcement features integrated therewith.
Figure 19:
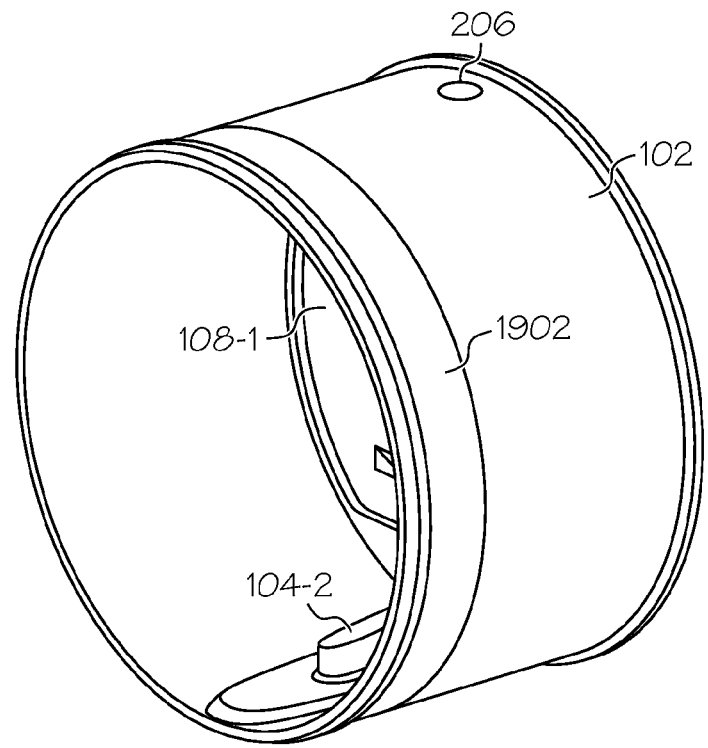

In addition to each of the one or more features described above, the check valve 100 may also include one or more reinforcement features. These reinforcement features, when included, are integrally formed on the valve body 102. The configuration of the reinforcement features may vary. In the embodiment depicted in FIG. 1, a plurality of axial gussets 124 are integrally formed on the inner surface 116 of the valve body 102 adjacent to the outlet end 114. In the embodiment depicted in FIG. 18, a single, contiguous, tangential gusset 1802 is formed on the inner surface 116 of the valve body 102 adjacent to the outlet end 114. It will be appreciated that the gussets depicted in FIGS. 1 and 18 may also or instead be formed on the outer surface of the valve body 102. In yet another embodiment, which is depicted in FIG. 19, a metal ring 1902 is injected molded with the valve body 102 and is disposed adjacent to the outlet end 114. Although the metal ring 1902 is depicted as being disposed in the outer surface of the valve body 102, in some embodiments it may instead (or also) be disposed in the inner surface of the valve body.

The split flapper check valve disclosed herein does not exhibit the leakage and wear issues of presently known check valves. The disclosed check valve also does not rely on a relatively tedious, time-consuming, and thus costly assembly procedure.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A check valve, comprising:
a valve body including an inlet end, an outlet end, and an inner surface that defines a flow passage between the inlet end and the outlet end, the inner surface further defining a valve seat adjacent the inlet end;
a pair of stoppers integrally formed on the valve body inner surface, each stopper having a first end and a second end, each first end disposed proximate the inlet end and including a hinge pin opening formed therein, each second end disposed downstream of the first end;
a hinge pin disposed within each hinge pin opening and extending across the flow passage; and
one or more flappers disposed within the flow passage and rotationally mounted on the hinge pin, each of the one or more flappers rotatable between a closed position, in which the flapper engages the valve seat, and a full-open position, in which the flapper engages the pair of stoppers,
wherein each stopper is dimensioned such that:
the first end extends radially inwardly from the inner surface a first distance;
the second end extends radially inwardly from the inner surface a second distance;
the first distance is greater than the second distance;
the first end has a first width;
the second end has a second width; and
the first width is greater than the second width.

2. The check valve of claim 1, wherein:
the hinge pin openings extend through the valve body; and
the hinge pin is press fit into the hinge pin openings.

3. The check valve of claim 2, further comprising:
a pair of adhesive pockets formed in the valve body, each adhesive pocket formed around one of the valve body hinge pin openings; and
an adhesive disposed in each adhesive pocket and around a portion of the hinge pin.

4. The check valve of claim 1, further comprising:
a pair of inserts, each insert disposed in a different one of the hinge pin openings.

5. The check valve of claim 4, wherein:
at least one of the inserts has insert threads formed on an inner surface thereof; and
the hinge pin has pin threads formed on at least a portion of its outer surface, at least a portion of the pin threads engaging the insert threads.

6. The check valve of claim 4, wherein:
each insert has insert threads formed on an inner surface thereof; and
the check valve further includes a pair of grub screws, each grub screw threaded into a different one of the inserts and securing the hinge pin in place.

7. The check valve of claim 4, wherein:
the hinge pin includes a first end and a second end;
the second end of the hinge pin is configured as a collet; and the second end extends through and engages one of the inserts.

8. The check valve of claim 4, further comprising:
one or more clips, each clip disposed around and engaging a different end of the hinge pin.

9. The check valve of claim 8, further comprising:
one or more lock pins, each lock pin engaging a different one of the clips.

10. The check valve of claim 8, further comprising:
an adhesive disposed within each of the hinge pin openings.

11. The check valve of claim 1, wherein:
each flapper is snap fit onto the hinge pin; and
the portion of each flapper that is snap fit onto the hinge pin is at least partially metal insert molded.

12. The check valve of claim 1, further comprising:
one or more gussets integrally formed on either the inner surface or outer surface of the valve body.

13. The check valve of claim 1, further comprising:
a metal ring disposed proximate the outlet end of the valve body, the metal ring insert molded with the valve body.

14. The check valve of claim 1, wherein the valve body, the stoppers, and flappers are all formed of a fiber reinforced plastic.

15. A check valve, comprising:
a valve body including an inlet end, an outlet end, and an inner surface that defines a flow passage between the inlet end and the outlet end, the inner surface further defining a valve seat adjacent the inlet end;
a pair of stoppers integrally formed on the valve body inner surface, each stopper having a first end and a second end, each first end disposed proximate the inlet end and having a hinge pin opening formed therein that extends through the valve body, each second end disposed downstream of the first end,;
a hinge pin press fit into each hinge pin opening, the hinge pin extending through each hinge pin opening and across the flow passage; and
a pair of flappers disposed within the flow passage and rotationally mounted on the hinge pin, each flapper rotatable between a closed position, in which the flapper engages the valve seat, and a full-open position, in which the flapper engages the pair of stoppers,
wherein:
each stopper is dimensioned such that (i) the first end extends radially inwardly from the inner surface a first distance, (ii) the second end extends radially inwardly from the inner surface a second distance, and (iii) the first distance is greater than the second distance,
the valve body, the stoppers, the hinge pin, and flappers are all formed of a fiber reinforced plastic, and
each flapper is snap fit onto the hinge pin.

16. The check valve of claim 15, further comprising:
one or more reinforcement features integrally formed on the valve body.

17. A check valve, comprising:
a valve body including an inlet end, an outlet end, and an inner surface that defines a flow passage between the inlet end and the outlet end, the inner surface further defining a valve seat adjacent the inlet end;
a pair of stoppers integrally formed on the valve body inner surface, each stopper having a first end and a second end, each first end disposed proximate the inlet end and including a hinge pin opening formed therein, each second end disposed downstream of the first end;
a pair of inserts, each insert disposed in a different one of the hinge pin openings;
an adhesive disposed within each of the hinge pin openings;
a hinge pin disposed within each hinge pin opening and extending across the flow passage;
one or more clips, each clip disposed around and engaging a different end of the hinge pin; and
one or more flappers disposed within the flow passage and rotationally mounted on the hinge pin, each of the one or more flappers rotatable between a closed position, in which the flapper engages the valve seat, and a full-open position, in which the flapper engages the pair of stoppers.

* * * * *